United States Patent
Schuler et al.

(10) Patent No.: US 10,059,452 B2
(45) Date of Patent: Aug. 28, 2018

(54) AIRPLANE SEAT DEVICE

(71) Applicant: RECARO Aircraft Seating GmbH & Co. KG, Schwaebisch Hall (DE)

(72) Inventors: Thomas Schuler, Schwaebisch Hall (DE); Michael Horlacher, Schwaebisch Hall (DE); Andre Gaertner, Schwaebisch Hall (DE); Heiko Minzer, Schwaebisch Hall (DE); Anne Dobritz, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 15/100,093

(22) PCT Filed: Nov. 27, 2014

(86) PCT No.: PCT/EP2014/075839
§ 371 (c)(1),
(2) Date: May 27, 2016

(87) PCT Pub. No.: WO2015/078979
PCT Pub. Date: Jun. 4, 2015

(65) Prior Publication Data
US 2017/0001727 A1    Jan. 5, 2017

(30) Foreign Application Priority Data
Nov. 29, 2013 (DE) .................. 10 2013 113 236

(51) Int. Cl.
*B64D 11/00* (2006.01)
*B64D 11/06* (2006.01)

(52) U.S. Cl.
CPC .......... *B64D 11/0007* (2013.01); *B64D 11/06* (2013.01); *B64D 11/0636* (2014.12)

(58) Field of Classification Search
CPC .. B64D 11/0007; B64D 11/0636; B64D 11/06
See application file for complete search history.

(56) References Cited

U.S. PATENT DOCUMENTS

| 5,415,457 A | 5/1995 | Kifer |
| 8,141,948 B2 * | 3/2012 | Cassellia ............... B60K 35/00 297/188.04 |

(Continued)

FOREIGN PATENT DOCUMENTS

| DE | 203 02 093 U1 | 7/2003 |
| DE | 10 2005 027 390 A1 | 12/2006 |

(Continued)

OTHER PUBLICATIONS

Search Report dated Jul. 24, 2014 issued in corresponding DE patent application No. 10 2013 113 236.7 (and partial English translation).

(Continued)

*Primary Examiner* — Philip F Gabler
(74) *Attorney, Agent, or Firm* — Posz Law Group, PLC

(57) ABSTRACT

An airplane seat device includes at least one airplane seat element implementing at least a portion of a table-less airplane seat, with at least one deposit and/or storage element which is embodied separate from the airplane seat element; the airplane seat element comprising at least one interface via which the deposit and/or storage element can be connected to the airplane seat element if required.

14 Claims, 9 Drawing Sheets

(56) References Cited

U.S. PATENT DOCUMENTS

Figure 1:
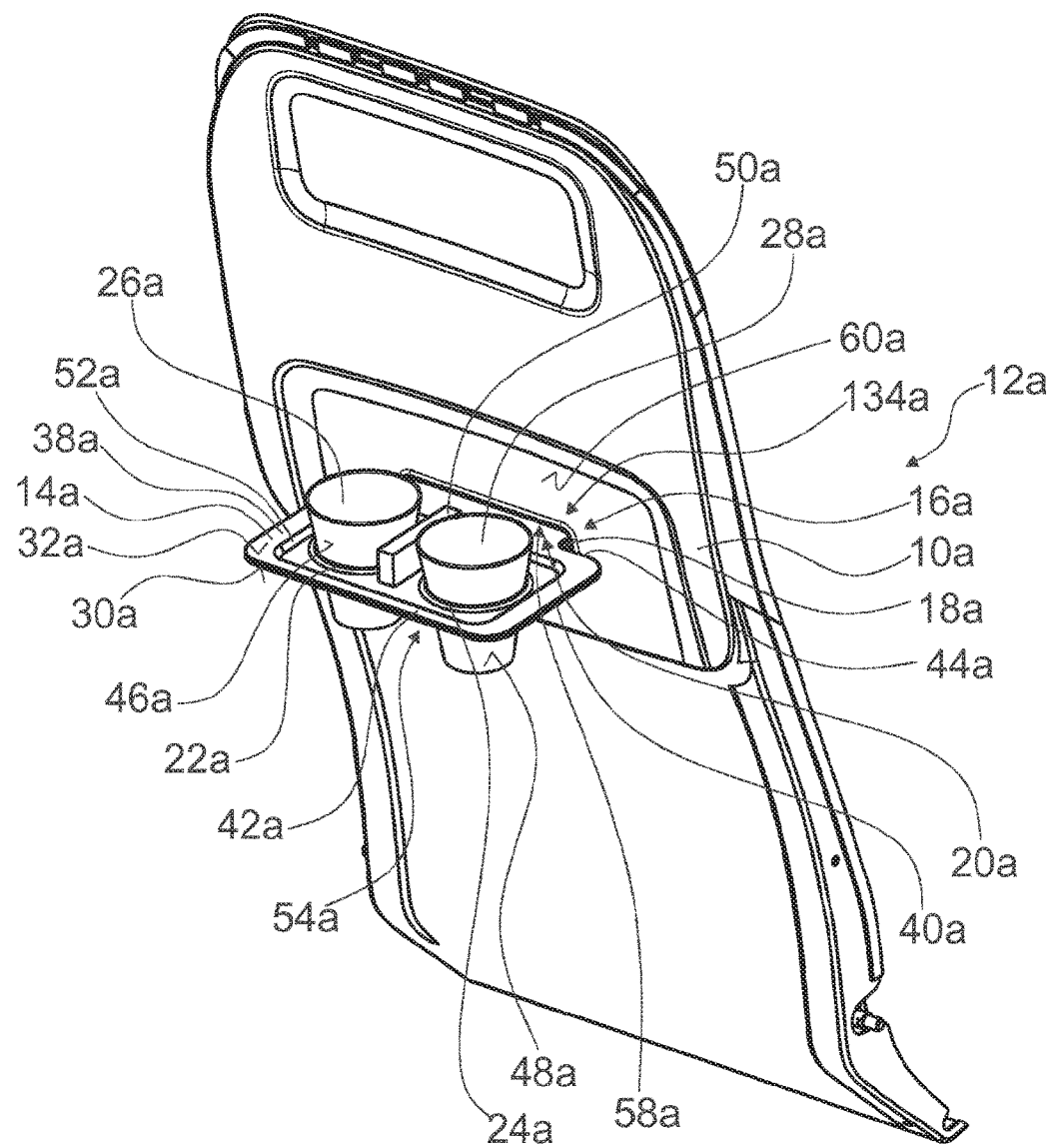

| | | | |
|---|---|---|---|
| 9,511,862 B2* | 12/2016 | Thiele | B64D 11/06 |
| 2005/0127122 A1 | 6/2005 | McKenzie et al. | |
| 2008/0238169 A1* | 10/2008 | Hicks | B60N 3/004 |
| | | | 297/353 |
| 2008/0252111 A1* | 10/2008 | Rothkop | B60N 3/004 |
| | | | 297/188.04 |
| 2011/0121617 A1 | 5/2011 | Beyer et al. | |
| 2011/0278885 A1* | 11/2011 | Procter | B60R 11/0235 |
| | | | 297/135 |
| 2012/0120626 A1* | 5/2012 | Akaike | B60R 11/02 |
| | | | 361/807 |

FOREIGN PATENT DOCUMENTS

| | | |
|---|---|---|
| DE | 10 2008 010 032 A1 | 10/2008 |
| DE | 10 2008 026 819 A1 | 12/2009 |
| DE | 20 2009 008 901 U1 | 3/2010 |
| DE | 10 2009 042 879 A1 | 3/2011 |
| EP | 1 948 946 B1 | 12/2010 |
| WO | 97/26811 A1 | 7/1997 |
| WO | 2011/143648 A2 | 11/2011 |

OTHER PUBLICATIONS

International Search Report of the International Searching Authority dated Feb. 3, 2015 issued in the corresponding International application No. PCT/EP2014/075839 (and English translation).
International Preliminary Report on Patentability dated May 31, 2016 issued in the corresponding International application No. PCT/EP2014/075839 (and English translation).

* cited by examiner

AIRPLANE SEAT DEVICE

CROSS REFERENCE TO RELATED APPLICATIONS

This application is a U.S. national stage application of PCT/EP2014/075839 filed on Nov. 27, 2014, which is based on German Patent Application No. 10 2013 113 236.7 filed on Nov. 29, 2013, the contents of which are incorporated herein by reference.

STATE OF THE ART

The invention relates to an airplane seat device according to the preamble of patent claim 1.

An airplane seat device, with at least one airplane seat element and with at least one deposit and/or storage element which is embodied separate from the airplane seat element, has already been proposed.

The objective of the invention is in particular to provide a generic device having i proved characteristics regarding weight and comfort. The objective is achieved according to the invention by the features of patent claim 1, while advantageous implementations and further developments of the invention may be gathered from the dependent claims.

ADVANTAGES OF THE INVENTION

According to the invention an airplane seat device is proposed, with at least one airplane seat element embodying at least a portion of a table-less airplane seat, and with at least one deposit and/or storage element which is embodied separate from the airplane seat element; the airplane seat element comprising at least one interface via which the deposit and/or storage element can be connected to the airplane seat element if required. An "airplane seat element" is herein to be in particular understood as an element embodying at least a portion of an airplane seat or of an airplane seat region, e.g, preferably a backrest, Principally, however, it is also conceivable that the airplane seat element is embodied as a different element of the airplane seat or of the airplane seat region, e,g. as an armrest or as a headrest. Principally, it is also conceivable that the airplane seat element is embodied as a partition wall of a seat region of the kind provided, for example, in a First-Class and/or Business-Class area of an airplane, The airplane seat element may, however, principally also be implemented as a wall which is arranged in front of a first seat row and separates off the seating region of the foremost seat row. A "table-less airplane seat" is herein to be in particular understood as an airplane seat which in a fully mounted state does not comprise a table mounted to it. Herein the table-less airplane seat in particular does not comprise a table that is pivotably arranged on a rear side of a backrest of the airplane seat. A "deposit and/or storage element" is herein to be in particular understood as an element which is provided for allowing one or several elements to be arranged on the deposit and/or storage element safely. In this the elements which are safely arrangeable on the deposit andlor storage element are implemented, for example, as drink vessels, in particular cups, as packaged food items, in particular snacks, e.g. biscuits or a roll, and/or as mobile devices, e.g. a PED. By a "FED" is to be understood in particular an electronic device, e.g. a tablet computer. The deposit and/or storage element is herein preferably made of a plastic material and/or of a cellulose material. Principally, it is also conceivable that the deposit and/or storage element is made of a metal, in particular a light metal, e.g. aluminum or another light, stable material that is deemed expedient by a person having ordinary skill in the art. It is principally also conceivable that the deposit and/or storage element is made of a composition of different materials. By the term that the "deposit and/or storage element is embodied separate from the airplane seat element" is herein in particular to be understood that the deposit and/or storage element is an element which is embodied separate from the airplane seat element and in particular has no substance-to-substance bond with the airplane seat element. The deposit and/or storage element is in a fully mounted state embodied separate from the airplane seat element and can be fixedly connected to the airplane seat element via a form-fit and/or force-fit connection and can then be separated from the airplane seat element in a non-destructive manner. This allows implementing a deposit and/or storage element advantageously separate from the airplane seat and easily connecting the deposit and/or storage element to the airplane seat if required. By means of an implementation according to the invention, in particular a simple, light-weight airplane seat may be provided, to which advantageously a deposit and/or storage element may be mounted, as a result of which a passenger may advantageously make use of a functionality of the deposit and/or storage element if required.

It is further proposed that the interface comprises at least one force-fit and/or form-fit element, via which the deposit and/or storage element can be connected to the airplane seat element. A "force-fit and/or form-fit element" is herein in particular to be understood as an element which is provided to be connected to a correspondingly embodied force-fit and/or form-fit element in a force-fit and/or form-fit manner for the purpose of in particular connecting two elements to each other, which the force-fit and/or form-fit elements are coupled to. By "connected in a force-fit and/or form-fit manner" is in particular a releasable connection to be understood, in which a holding force between two structural elements is preferably transferred via a geometric engagement of the structural elements into each other and/or by a friction force between the structural elements. By the phrasing that the "deposit and/or storage element can be connected" is herein in particular to be understood that the deposit and/or storage element can be connected to the airplane seat element but is not necessarily connected to the airplane seat element. Thus the interface can be easily implemented for connecting the deposit and/or storage element.

Furthermore it is proposed that the force-fit and/or form-fit element of the interface is embodied as a recess which the deposit and/or storage element is insertable into. In this "insertable" is in particular to mean that an element, like in particular the deposit and/or storage element, can be coupled to the force-fit and/or form-fit element via a mounting movement which is effected at least substantially in only one movement direction, with the deposit and/or storage element engaging into the force-fit and/or form-fit element during assembly. In this way the interface can be embodied in a particularly simple manner and the deposit and/or storage element can be connected to the airplane seat element via the interface in a particularly simple manner.

It is moreover proposed that the airplane seat element is embodied as a backrest. This allows implementing the airplane seat element in a particularly advantageous fashion and connecting the deposit and/or storage element to the airplane seat in a particularly advantageous location.

Further it is proposed that the deposit and/or storage element is provided to be mounted to the airplane seat element tool-lessly. By "provided" is in particular to be understood specifically designed and/or equipped. By an object being provided for a certain function is to be in particular understood that the object fulfills and/or executes said certain function in at least one application state and/or operative state. By "to be mounted tool-lessly" is in particular to be understood that the deposit and/or storage element can be mounted to the airplane seat element by a person just manually, Herein the deposit and/or storage element is mountable to the airplane seat element in particular without using a tool. This allows the deposit and/or storage element to be mounted to the airplane seat in an especially simple and advantageous manner, in particular by a passenger him/herself.

It is further proposed that the deposit and/or storage element comprises at least one interface which can be coupled to the interface of the airplane seat element. This allows implementing the deposit and/or storage element in a particularly advantageous and simple fashion for mounting to the airplane seat.

Moreover it is proposed that the deposit and/or storage element is embodied as a serving element. A "serving element" is herein to be in particular understood as an element, e.g. in particular a tray or a table element, on which objects or goods, in particular food items or beverages, may be served and placed during consumption, In this way the deposit and/or storage element can be implemented especially advantageously for serving food items and beverages.

It is also proposed that the deposit and/or storage element comprises at least one receptacle for a drink vessel. A "drink vessel" is in this context in particular to be understood as a vessel, e.g. a cup, a can and/or a bottle. Drink vessels are herein preferably distributed to passengers during a flight by the staff of the airplane. As a result of this, a drink vessel can be advantageously arranged at the deposit and/or storage element in a captive fashion.

Furthermore it is proposed that the deposit and/or storage element is implemented as a holding device, By a "holding device" is herein in particular to be understood a device, which is provided for receiving and captively arranging or storing a third element. In this the holding device is provided for a person, e.g. in particular a flight passenger, captively storing a third element in the holding device during a flight. A "third element" is herein in particular to be understood as an element which is provided to be used by a flight passenger and/or which can be used by a flight passenger during a flight, e.g. in particular an electronic device, e.g. a PED, or a book. This allows especially advantageously implementing the deposit and/or storage element as a holder for a passenger's objects, e.g. of a PED, and advantageously providing a passenger, if he desires, with an opportunity of fastening a respective element to the airplane seat.

It is further proposed that the deposit and/or storage element has an underside and an upper side, which are embodied corresponding to each other. An "upper side" is herein in particular to mean a side of the deposit and/or storage element which, in a state when mounted to the airplane seat, faces away from a mounting plane which the airplane seat is mounted on. Herein the upper side of a deposit and/or storage element implemented as a sewing element is embodied as a table top, on which the respective elements, e.g. food items and beverages, can be placed. An "underside" is herein in particular to be understood as a side of the deposit and/or storage element which, in a state when mounted to the airplane seat, faces a mounting plane which the airplane seat is mounted on. By the underside and the upper side being "embodied corresponding to each other" is in particular to be understood that a contour of the upper side and a contour of the underside correspond to each other, as a result of which in particular two identically embodied deposit and/or storage elements may advantageously be stacked one upon the other, the upper side of the one deposit and/or storage element engaging into the underside of the other deposit and/or storage element in a form-fit fashion. This allows stacking a plurality of deposit and/or storage elements in a particularly advantageous and space-saving fashion, as a result of which in particular many deposit and/or storage elements may advantageously be stored in little space.

It is further proposed that the deposit and/or storage element is at least substantially made of a plastic and/or cellulose material. A "plastic material" is herein in particular to be understood as a plastic material, edg, in particular a polyamide (PA) or another plastic material that is deemed expedient by the person having ordinary skill in the art. It is herein conceivable that the deposit and/or storage element is made of a high-temperature plastic or of a fiber-enforced plastic, A "cellulose material" is herein in particular to be understood as a material that is made of plant fibers, e.g. in particular cardboard and/or paper. By the "deposit and/or storage element being at least substantially made of a plastic and/or cellulose material" is herein in particular to be understood that the deposit and/or storage element is implemented either from a plastic material or of a cellulose material by at least more than 50%, preferably more than 80% and in an especially advantageous embodiment more than 95%. In this it is principally also conceivable that the deposit and/or storage element is implemented to one part of a cellulose material and to the remaining part of a plastic material. It is thus conceivable, for example, that the deposit and/or storage element is implemented to a major part of a cellulose material and in certain regions, e.g. in a region of the interface, of a plastic material for re-enforcement. In this way the deposit and/or storage element can be implemented of an especially advantageous material.

It is moreover proposed that the deposit and/or storage element is provided to be used only once. This allows producing the deposit and/or storage element in a particularly cost-efficient manner, as it is not necessary to use high-grade materials.

Furthermore it is proposed that the interface of the airplane seat element comprises at least one compensation device, which is provided for movement-technically decoupling the deposit and/or storage element from the airplane seat element at least partially. By a "compensation device" is herein in particular to be understood a device which is provided for dampening movements of the airplane seat and in particular of the airplane seat element which the deposit and/or storage element is mounted to, as a result of which in particular vibrations and blows against the airplane seat element are not transferred to the deposit and/or storage element without dampening and the objects arranged on the deposit and/or storage element are thus prevented from possibly falling. It is further conceivable that the compensation device is provided for compensating a re-adjustment of an airplane seat element that is embodied as a backrest. Herein the deposit and/or storage element is preferably in each position of the airplane seat element embodied as a backrest, held in a preferably constant orientation with respect to a mounting plane which the airplane seat is mounted on. This allows particularly safe storage and protection from blows for objects that are arranged on the deposit and/or storage element.

The airplane seat device according to the invention is herein not to be limited to the application and implementation form described above. In particular, the airplane seat device according to the invention may comprise, for fulfilling a functionality herein described, a number of respective elements, structural components and units that differs from a number herein mentioned.

DRAWINGS

Further advantages will become apparent from the following description of the drawing. The drawing shows seven exemplary embodiments of the invention. The drawing, the description and the claims contain a plurality of features in combination. The person having ordinary skill in the art will purposefully also consider the features separately and will find further expedient combinations.

Figure 2:
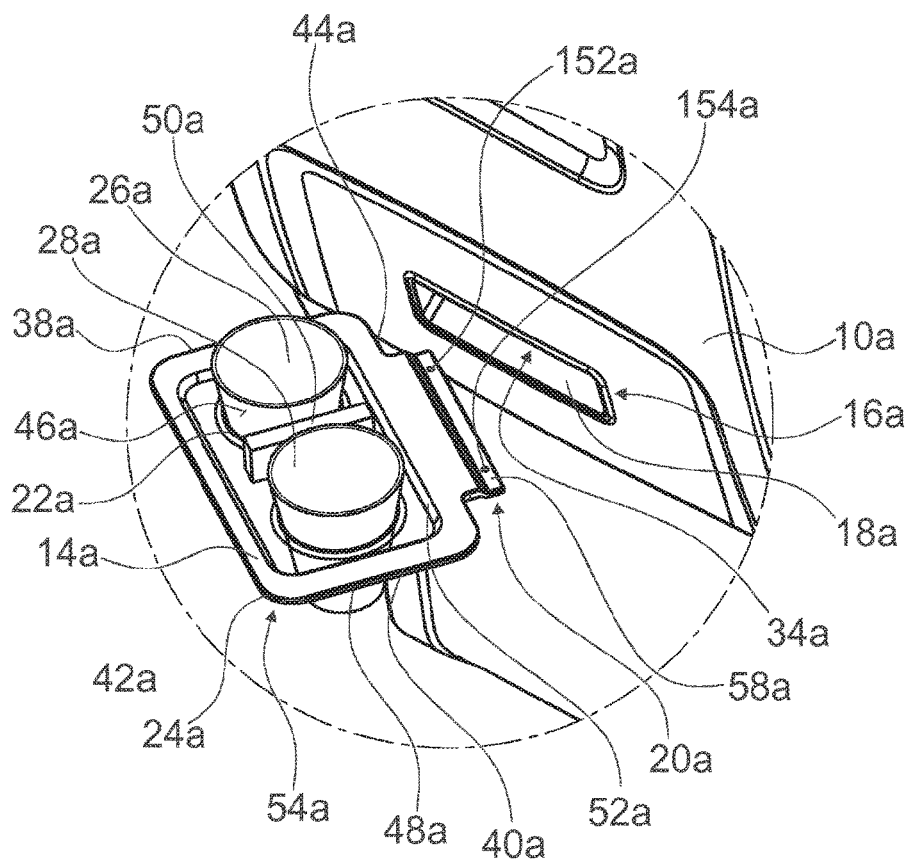
Figure 3:
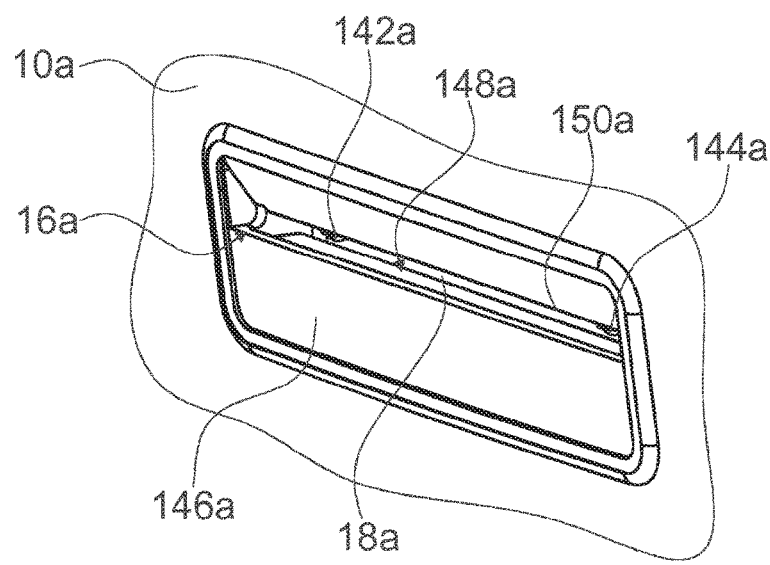
Figure 4:
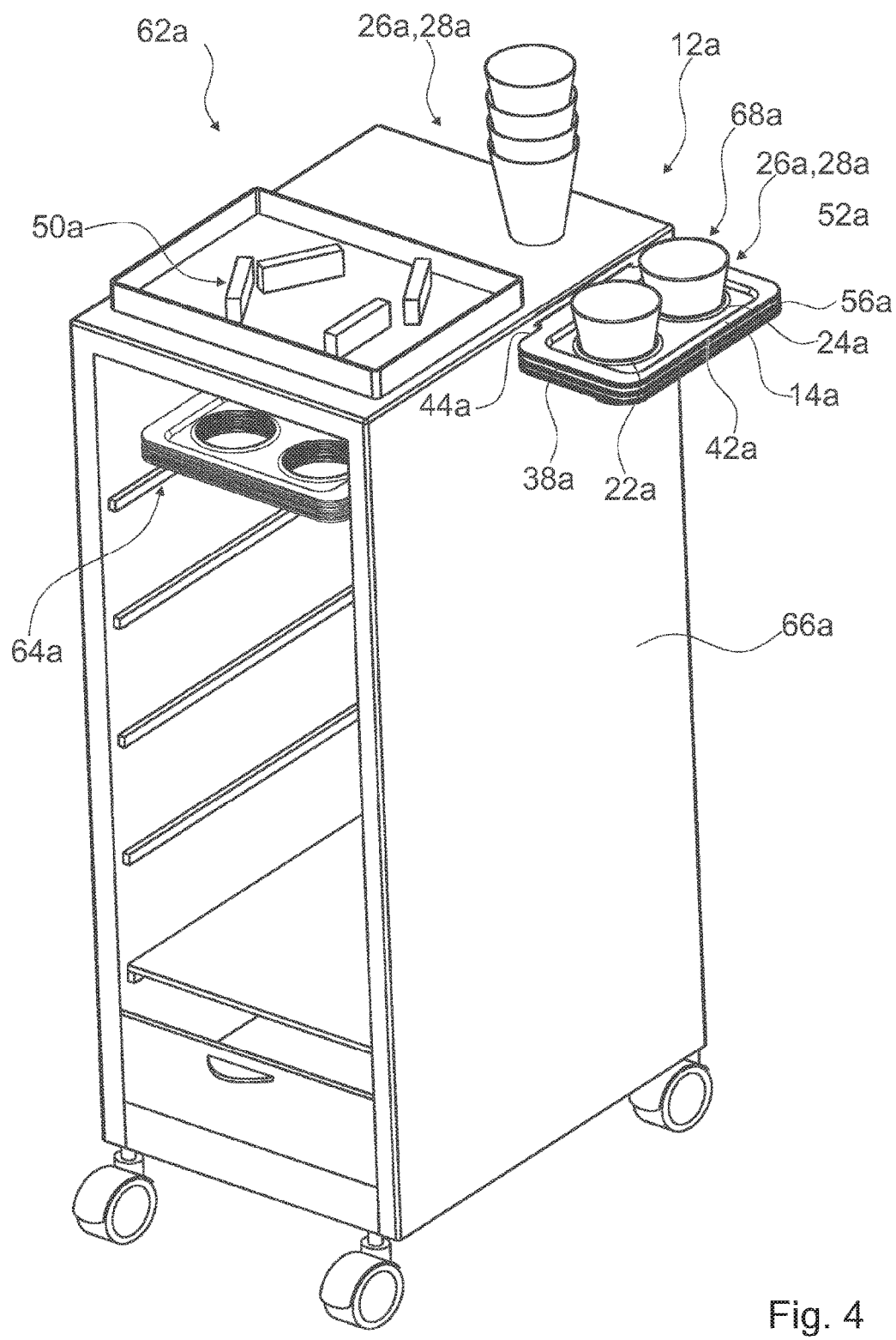
Figure 5:
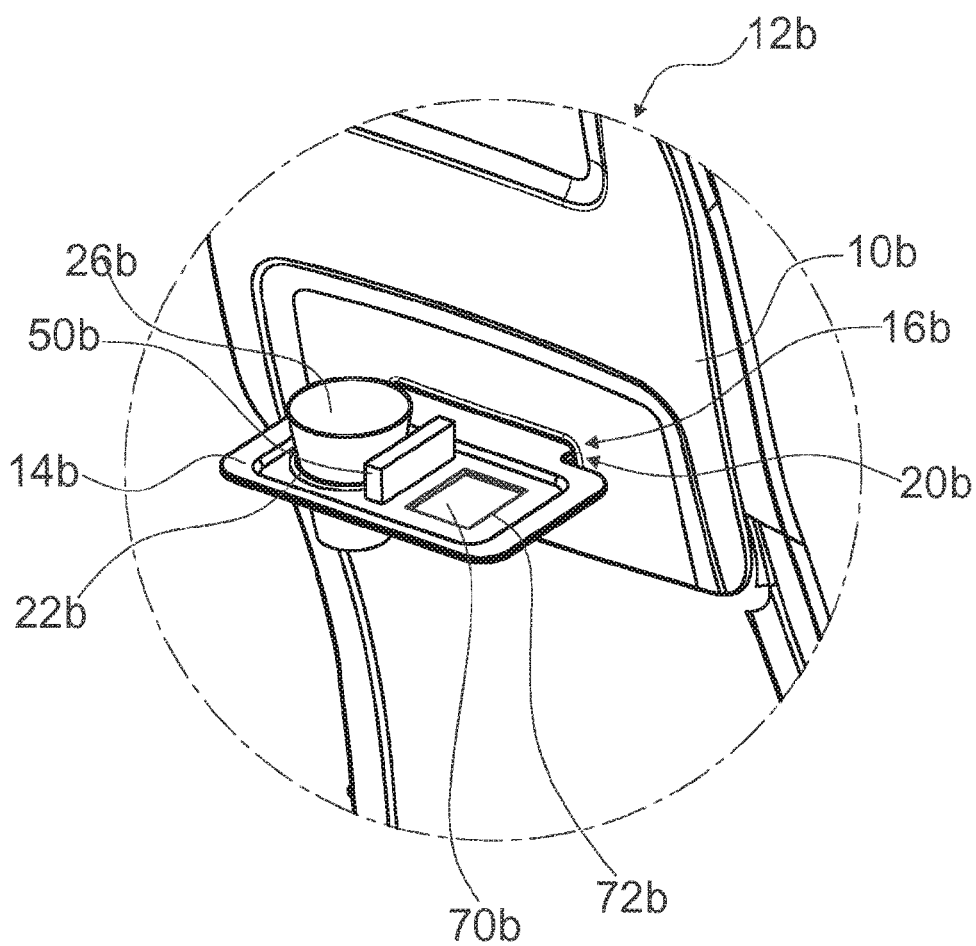
Figure 6:
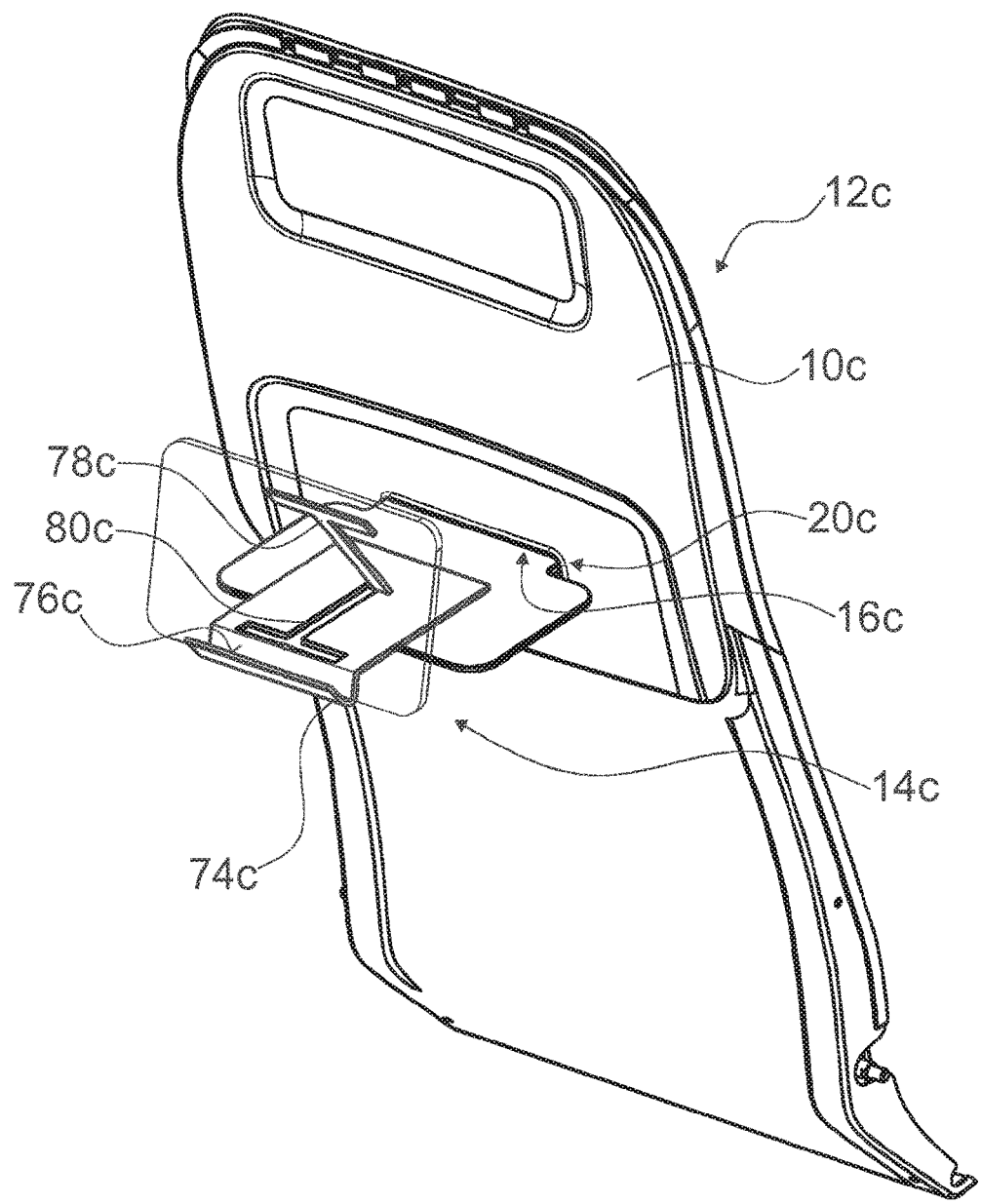
Figure 7:
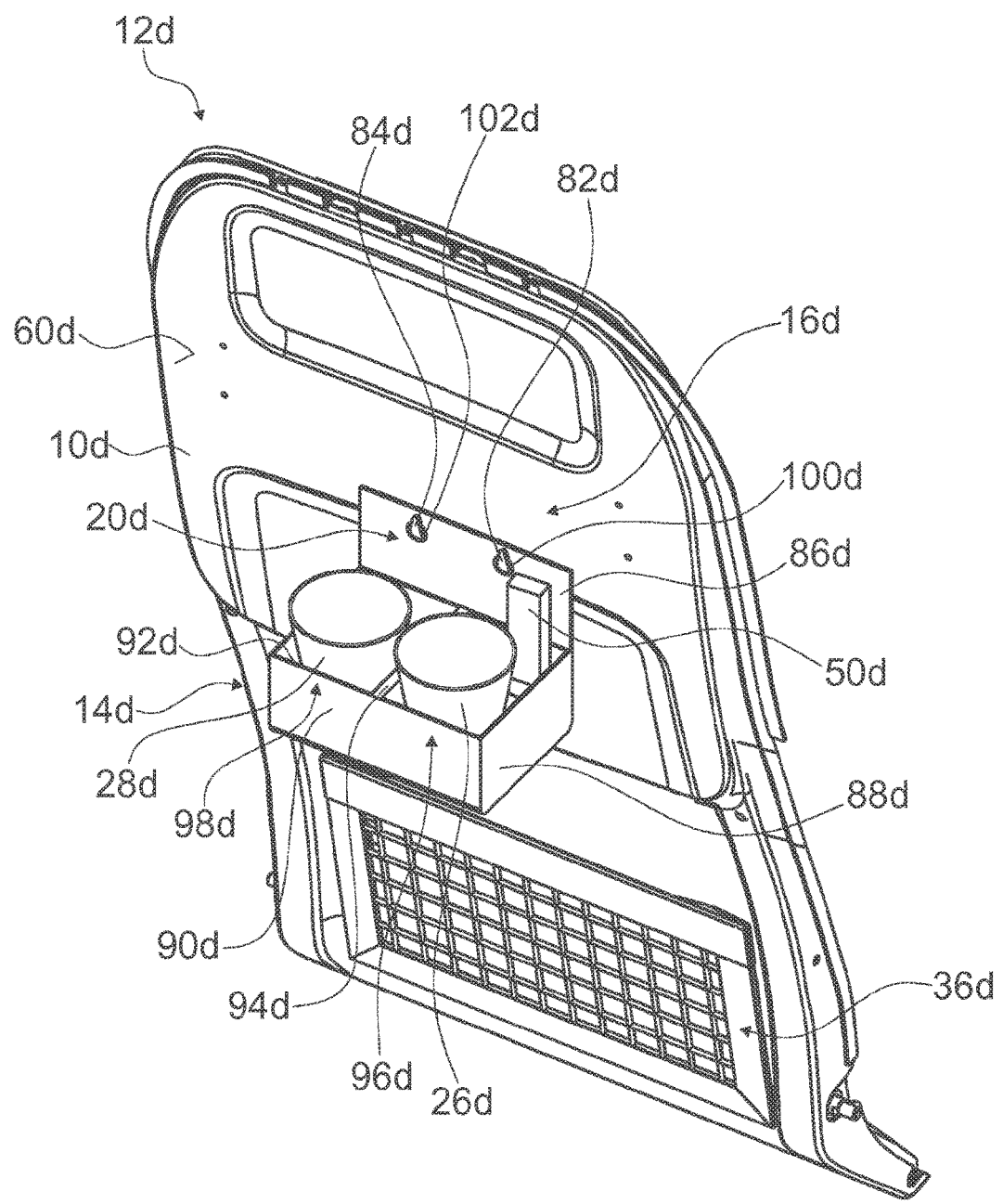
Figure 8:
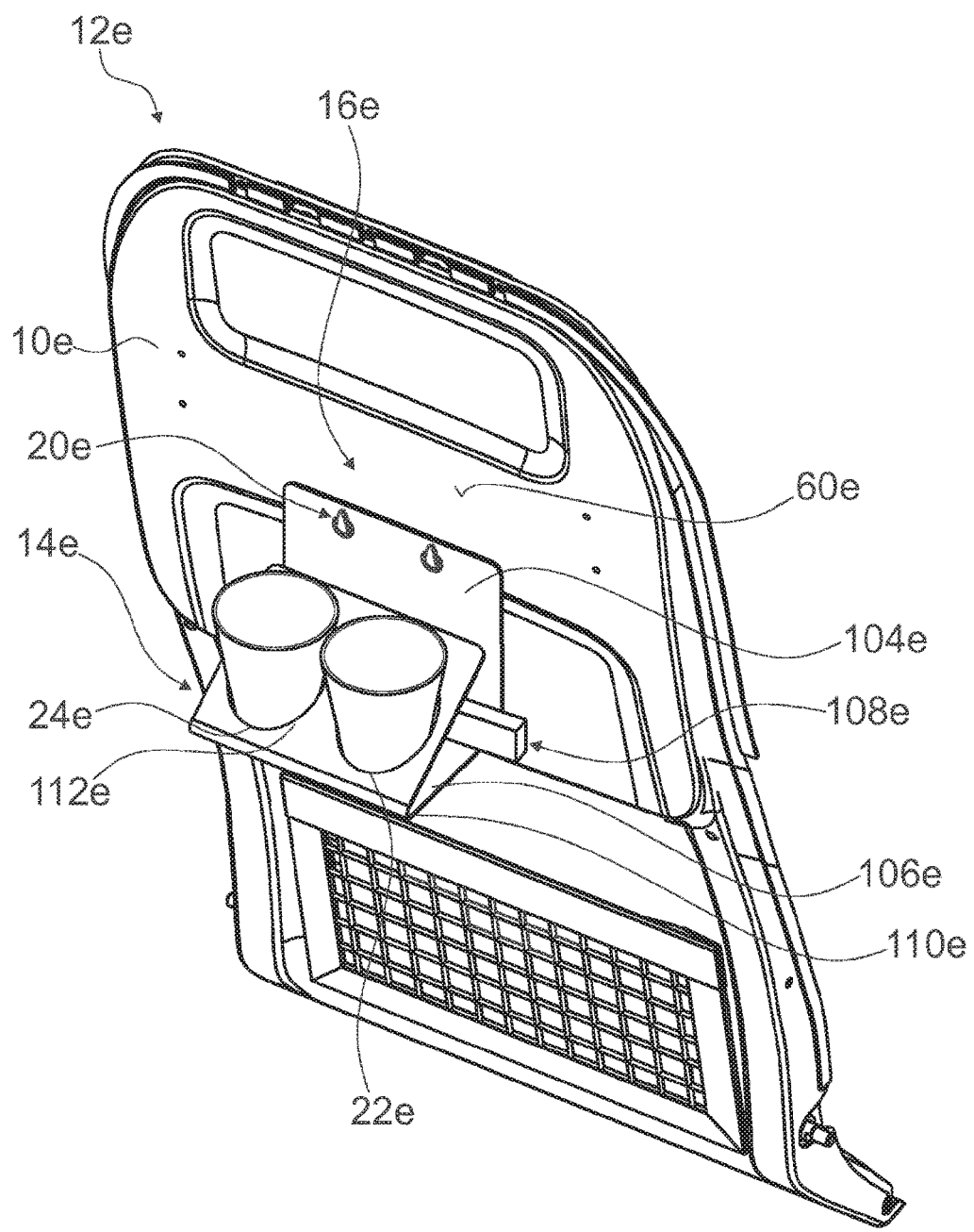
Figure 9:
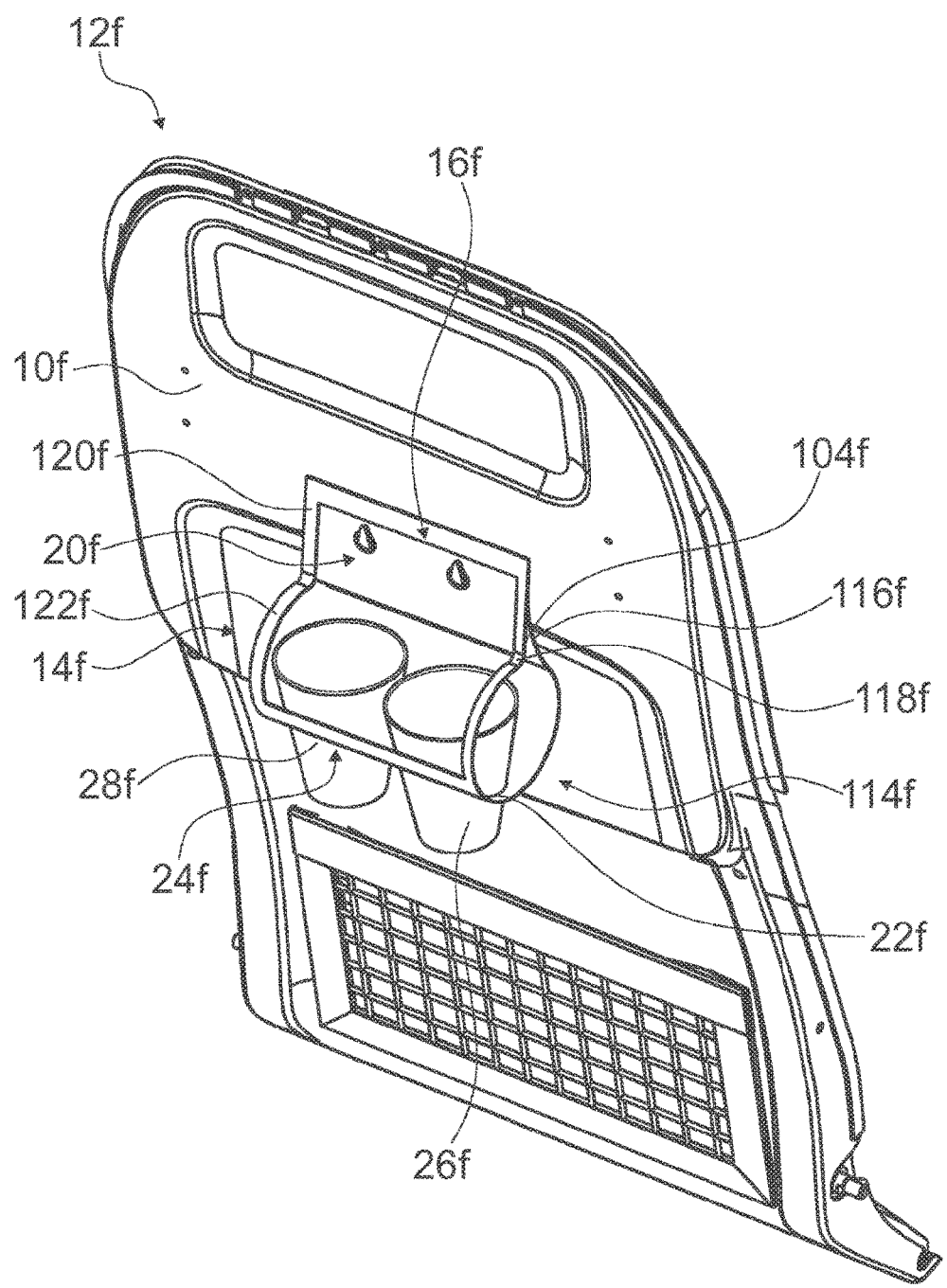
Figure 10:
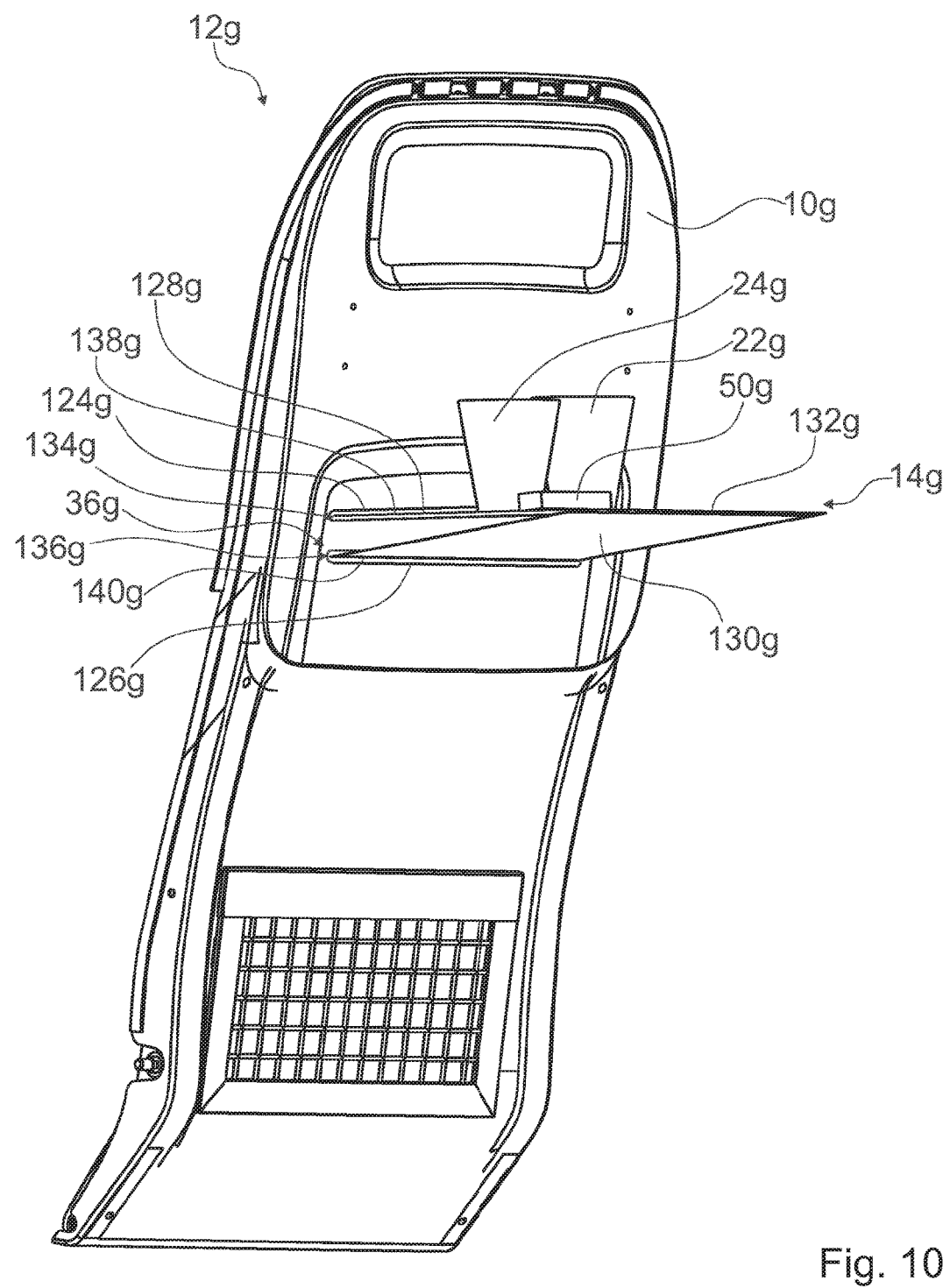

It is shown in:

FIG. 1 a schematic presentation of an airplane seat device according to the invention with an airplane seat element and a deposit and/or storage element, in a first exemplary embodiment, FIG. 2 the deposit and/or storage element in a state separate from the airplane seat element, FIG. 3 a detailed view of an interface of the airplane seat element, FIG. 4 a transporting and serving device with a plurality of deposit and/or storage elements according to the invention, FIG. 5 a schematic presentation of an airplane seat device according to the invention with an airplane seat element and a deposit and/or storage element, in a second exemplary embodiment, FIG. 6 a schematic presentation of an airplane seat device according to the invention with an airplane seat element and with a deposit and/or storage element embodied as a holding device, in a third exemplary embodiment, FIG. 7 a schematic presentation of an airplane seat device according to the invention with an airplane seat element and a deposit and/or storage element, in a fourth exemplary embodiment, FIG. 8 a schematic presentation of an airplane seat device according to the invention with an airplane seat element and a deposit and/or storage element, in a fifth exemplary embodiment, FIG. 9 a schematic presentation of an airplane seat device according to the invention with an airplane seat element and a deposit and/or storage element, in a sixth exemplary embodiment, and FIG. 10 a schematic presentation of an airplane seat device according to the invention with an airplane seat element and a deposit and/or storage element, in a seventh exemplary embodiment,

DESCRIPTION OF THE EXEMPLARY EMBODIMENTS

FIGS. 1 to 4 show a first exemplary embodiment of an airplane seat device according to the invention. The airplane seat device comprises an airplane seat 12a. The airplane seat 12a is implemented as a seat which is provided for an airplane passenger to sit in during a flight. The airplane seat 12a is mounted in an airplane (not shown in detail). For this purpose the airplane seat 12a comprises a mounting device (not shown in detail), via which the airplane seat 12a is mounted on a mounting plane. The mounting plane is herein embodied by a cabin floor of the airplane. The airplane seat device comprises an airplane seat element 10a. The airplane seat element 10a forms a portion of the airplane seat 12a. The airplane seat element 10a is herein embodied as a backrest. Principally it is also conceivable that the airplane seat element 10a is embodied as a different element of the airplane seat device, e.g. an armrest, a headrest, a footrest or a console, which further elements are mounted on, e.g. a display screen or depositing facilities.

The airplane seat 12a is herein embodied table-less. The airplane seat 12a does not comprise a table that is fixedly arranged at the airplane seat 12a. At the airplane seat element 10a embodied as a backrest, no table is arranged as is known from prior art, which is, for example, pivotably arrangeable at the backrest. The airplane seat element 10a embodied as a backrest has a rear side 60a facing a further airplane seat that is arranged behind the airplane seat 12a.

The airplane seat device comprises a deposit and/or storage element 14a. The deposit and/or storage element 14a is embodied separate from the airplane seat element 10a. The deposit and/or storage element 14a is made of a plastic material. The deposit and/or storage element 14a can be connected to the airplane seat element 10a if required. The deposit and/or storage element 14a is implemented as a serving element. The deposit and/or storage element 14a embodied as a serving element is provided for allowing beverages and/or food items to be deposited and served on it. The deposit and/or storage element 14a is embodied as a rectangular, planar plate. Principally it is however also conceivable that the deposit and/or storage element 14a has a different polygonal, circular or oval shape. The deposit and/or storage element 14a herein has two short lateral edges 38a, 40a and respectively one long front edge 42a and rear edge 44a. Herein, in a state when connected to the airplane seat element 10a, the rear edge 44a faces the airplane seat element 10a. The deposit and/or storage element 14a comprises an upper side 32a. The upper side 32a of the deposit and/or storage element 14a is embodied as a table top. Beverages and/or food items can be deposited or mounted on the table top. For this purpose the deposit and/or storage element 14a comprises two receptacles 22a, 24a. The receptacles 22a, 24a are implemented as pass-through holes extending from the upper side 32a to an underside 30a of the deposit and/or storage element 14a. The receptacles 22a, 24a are embodied circular. The receptacles 22a, 24a are arranged spaced apart from each other. The receptacles 22a, 24a are provided for allowing a drink vessel 26a, 28a to be arranged therein. A drink vessel 26a, 28a, e.g. a cup, may be inserted into the receptacle 22a, 24a from the upper side 32a of the deposit and storage element 14a by its underside 30a, which has a diameter smaller than a diameter of the respective receptacle 22a, 24a. The diameter of the drink vessel 26a, 28a increases towards the top, and exceeds the diameter of the respective receptacle 22a, 24a towards an upper rim of the drink vessel 26a, 28a. When the drink vessel 26a, 28a has been inserted into the respective receptacle 22a, 24a to such an extent that the drink vessel 26a, 28a abuts the respective receptacle 22a, 24a with its outer wall 46a, 48a, then the drink vessel 26a, 28a is fixed in the respective receptacle 22a, 24a in a form-fit fashion. Principally it is conceivable that the two receptacles 22a, 24a have diameters of different sizes, thus allowing drink vessels 26a, 28a or other elements of different sizes to be arranged in the receptacles 22a, 24a. Principally it is also conceivable that other elements, e.g. bowls or other storage elements, in which, for example, snacks such as nuts or the like, can be stored, may be arranged in the receptacles 22a, 24a. As can be seen in FIGS. 1 and 2, a region between the two receptacles 22a, 24a is provided for arranging a packaged snack 50a for serving therein. For this it is conceivable that a depression, in which a packaged snack 50a is arrangeable, is arranged in the region between the two receptacles 22a, 24a. Principally it is, for example, also conceivable that the deposit and/or storage element 14a comprises only one receptacle 22a, 24a and the entire region next to the one receptacle 22a, 24a is provided for a food item or a snack 50a to be arranged thereon. In this it is conceivable that the deposit and/or storage element 14a comprises a receptacle 22a, 24a for mounting a drink vessel 26a, 28a as well as a depression in which a food item or a snack 50a may be arranged.

The deposit and/or storage element 14a is provided to be stacked for storage in a space-saving fashion. For this purpose the upper side 32a and the underside 30a of the deposit and/or storage element 14a are embodied corresponding to each other. A contour of the underside 30a of the deposit and/or storage element 14a corresponds to a contour of the upper side 32a of the deposit and/or storage element 14a. The upper side 32a of the deposit and/or storage element 14a has a depression 52a encompassing the two receptacles 22a, 24a. The depression 52a has a same contour as the entire deposit and/or storage element 14a. Principally it is also conceivable that the depression 52a has a differing contour, is smaller and/or that the receptacles 22a, 24a are not arranged in the depression 52a. The underside 30a of the deposit and/or storage element 14a comprises a bump 54a which corresponds to the depression 52a on the upper side 32a of the deposit and/or storage element 14a. A height of the bump 54a on the underside 30a is herein slightly smaller than a depth of the depression 52a on the upper side 32a. This allows a further deposit and/or storage element 56a, which is embodied substantially identical, to be laid with its underside 30a upon the upper side 32a of the deposit andlor storage element 14a. A bump of the further deposit and/or storage element 56a is herein arranged in the depression 52a of the deposit and/or storage element 14a that is arranged underneath it, as a result of which a form-fit connection is established between the two deposit and/or storage elements 14a, 56a and these are thus fixedly positioned with respect to each other. Herein the two deposit and/or storage elements 14a, 56a lie one upon the other in a planar fashion. As can be seen in FIG. 4, a plurality of deposit and/or storage elements 14a, 56a may thus be stacked one above the other, the respective upper-situated deposit and/or storage element 14a, 56a planarly lying with its underside 30a upon an upper side 32a of the corresponding deposit and/or storage element 14a, 56a, which is situated underneath it.

The deposit and/or storage element 14a is provided for being mounted to the airplane seat element 10a tool-lessly. Herein no tool is required for a connection to the airplane seat element 10a. The deposit and/or storage element 14a is mountable to the airplane seat element 10a, i.e. to the airplane seat 12a in a purely manual manner. For the toolless connection of the deposit and/or storage element 14a to the airplane seat 12a, the airplane seat element 10a comprises an interface 16a. The deposit and/or storage element 14a is fixedly connectable to the airplane seat element 10a via the interface 16a. The interface 16a comprises a force-fit and/or form-fit element 18a, via which the deposit and/or storage element 14a can be connected to the airplane seat element 10a. The deposit and/or storage element 14a can be connected to the airplane seat element 10a via the force-fit and/or form-fit element 18a in a form-fit fashion. Principally it is also conceivable that the deposit and/or storage element 14a is connectable to the airplane seat element 10a via a force-fit connection. It would herein be conceivable that, for a force-fit connection to the airplane seat element 10a, the deposit and/or storage element 14a is clamped into the interface 16a of the airplane seat element 10a. Principally a combination of a form-fit and a force-fit connection is also conceivable for connecting the deposit and/or storage element 14a to the airplane seat element 10a. The force-fit and/or form-fit element 18a of the interface 16a is implemented as a recess. The deposit and/or storage element 14a is insertable into the force-fit and/or form-fit element 18a embodied as a recess. In a state when the deposit and/or storage element 14a has been inserted in the force-fit and/or form-fit element 18a embodied as a recess, the deposit and/or storage element 14a is coupled to the interface 16a in a form-fit fashion.

FIG. 3 shows a detailed view of the interface 16a of the airplane seat element 10a. The force-fit and/or form-fit element 18a, which is embodied as a recess, forms an undercut 148a to the rear of a front wall 146a. An upper wall 150a of the force-fit and/or form-fit element 18a embodied as a recess extends up to below an upper edge of the front wall 146a. The interface 16a comprises two fixing elements 142a, 144a. The fixing elements 142a, 144a are arranged in the upper wall 150a. The fixing elements 142a, 144a are embodied as spring-loaded pressure pins, which project downwards into the force-fit and/or form-fit element embodied as a recess. The fixing elements 142a, 144a embodied as pressure pins can be moved counter to a spring load towards the upper wall 150a. The fixing elements 142a, 144a are provided for fixing the deposit and/or storage element 14a in a state when it is arranged in the force-fit and/or form-fit element embodied as a recess. For this purpose the fixing elements 142a, 144a exert a force onto the deposit and/or storage element 14a if this is mounted correctly in the force-fit and/or form-fit element 18a embodied as a recess. Principally it is also conceivable that the fixing elements 142a, 144a are embodied as magnets or as differently implemented pressure pieces.

For a connection to the airplane seat element 10a, the deposit and/or storage element 14a comprises an interface 20a. The interface 20a of the deposit and/or storage element 14a can be coupled to the interface 16a of the airplane seat element 10a. Via the coupling of the two interfaces 16a, 20a the deposit and/or storage element 14a can be connected to the airplane seat element 10a. The interface 20a of the deposit and/or storage element 14a is arranged at the rear edge 44a of the deposit andlor storage element 14a. The interface 20a implements a force-fit and/or form-fit element 58a. The force-fit and/or form-fit element 58a is embodied as a tab extending away from the front edge 42a, starting from the rear edge 44a of the deposit and/or storage element 14a, The force-fit and/or form-fit element 58a embodied as a tab forms an undercut, by means of which the force-fit andlor form-fit element 58a engages in a form-fit fashion into the force-fit and/or form-fit element 18a of the interface 16a of the airplane seat element 10a, which is embodied as a recess. In an end facing away from the rear end 44a of the deposit and/or storage element 14a, the force-fit and/or form-fit element 58a embodied as a tab extends downwards towards the underside 30a of the deposit and/or storage element 14a. It is herein conceivable that the force-fit and/or form-fit element 58a embodied as a tab extends downwards over the underside 30a of the deposit and/or storage element 14a. Principally it is also conceivable that the force-fit andlor form-fit element 58a of the interface 20a is embodied in a different fashion deemed expedient by the person skilled in the art, and/or that the interface 20a comprises a plurality of force-fit and/or form-fit elements 58*a*. For connecting the deposit and/or storage element 14*a* to the airplane seat element 10*a* the force-fit and/or form-fit element 58*a* of the deposit and/or storage element 14*a*, which is embodied as a tab, is introduced into the force-fit and/or form-fit element 18*a* of the airplane seat element 10*a*, which is embodied as a recess, and is connected thereto in a form-fit fashion. In a state in which the force-fit and/or form-fit element 58*a* of the deposit and/or storage element 14*a*, which is embodied as a tab, has been introduced into the force-fit and/or form-fit element 18*a* of the airplane seat element 10*a*, the fixing elements 142*a*, 144*a* press onto the force-fit and/or form-fit element 58*a* embodied as a tab, and tension the deposit and/or storage element 14*a* in the interface 16*a*, for the purpose of fixing the deposit and/or storage element 14*a*. For connecting to the fixing elements 142*a*, 144*a*, the force-fit and/or form-fit element 58*a* of the deposit and/or storage element 14*a*, which is embodied as a tab, comprises receptacles 152*a*, 154*a*. The fixing elements 142*a*, 144*a* engage into the receptacles 152*a*, 154*a* for fixing the deposit and/or storage element 14*a*. When the deposit and/or storage element 14*a* is connected in the interface 16*a* of the airplane seat element 10*a*, the fixing elements 142*a*, 144*a* are deflected counter to their spring load when the force-fit and/or form-fit element 58*a* embodied as a tab is introduced into the form-fit and/or force-fit element 18*a* embodied as a recess and, on reaching a correctly arranged position, the fixing elements 142*a*, 144*a* latch into the receptacles 152*a*, 154*a* and press the deposit and/or storage element 14*a* downwards in a region of the force-fit and/or form-fit element 58*a* embodied as a tab, thus tensioning the deposit and/or storage element 14*a* in the interface 16*a*. If the fixing elements 142*a*, 144*a* are implemented as magnets, the force-fit and/or form-fit element 58*a* of the deposit and/or storage element 14*a*, which is embodied as a tab, has instead of the receptacles 152*a*, 154*a* also magnets which, in a state in which the deposit and/or storage element 14*a* is correctly arranged in the interface 16*a*, magnetically connect to the fixing elements 142*a*, 144*a*, which are implemented as magnets. It is herein principally conceivable that for an especially firm and secure connection the force-fit and/or form-fit element 58*a* of the deposit and/or storage element 14*a* is clamped into the force-fit and/or form-fit element 18*a* of the airplane seat element 10*a*, which is embodied as a recess.

The interface 16*a* of the airplane seat element 10*a* comprises a compensation device 34*a*. The compensation device 34*a* is provided for movement-technically decoupling the deposit and/or storage element 14*a* from the airplane seat element 14*a* at least partially. The compensation device 34*a* dampens a movement of the deposit and/or storage element 14*a* in case of a movement of the airplane seat element 10*a*. For this purpose the compensation device 34*a* comprises a spring-damper device (not shown in detail). Due to this, movements of the airplane seat element 10*a* generated, for example, by vibrations of the airplane or by blows to the airplane seat element 10*a*, are not transferred to the deposit and/or storage element 14*a* without dampening. This advantageously allows reducing a risk of spilling from drink vessels 26*a*, 28*a* which are arranged on the deposit and/or storage element 14*a*.

In FIG. 4 a transporting and serving device 62*a* is depicted in a schematic view. The transporting and serving device 62*a* is implemented as a pushable container and is provided for storing beverages and food items inside and on it, which are distributed to passengers by staff members during a flight. The transporting and serving device 62*a* comprises a receiving device 64*a*. The receiving device 64*a* is embodied, for example, as an opening. The receiving device 64*a* is provided for a plurality of deposit and/or storage elements 14*a*, 56*a* to be stored in it for transport. The receiving device 64*a* is herein arranged in an upper region of the transporting and serving device 62*a*. Herein as many deposit and/or storage elements 14*a*, 56*a* can be arranged as there are airplane seats which are served via the transporting and serving device 62*a*. In the receiving device 64*a* the deposit and/or storage elements 14*a*, 56*a* are stacked one above the other in a space-saving fashion. The deposit and/or storage elements 14*a*, 56*a* are herein easily removable from the receiving device 64*a* by a person. The transporting and serving device 62*a* has a receptacle 68*a* on a lateral wall 66*a*. The receptacle 68*a* is provided for allowing a plurality of deposit and/or storage elements 14*a*, 56*a* to be arranged on an exterior of the transporting and serving device 62*a*. Herein the deposit and/or storage elements 14*a*, 56*a* can be loaded with drink vessels 26*a*, 28*a*, food items and/or other elements while they are arranged at the receptacle 68*a* of the transporting and serving device 62*a*. When a deposit and/or storage element 14*a* has been loaded at the receptacle 68*a* by a staff member with the respective drinks and/or food items desired by a flight passenger, the deposit and/or storage element 14*a* is handed to the flight passenger, who then connects, via the interface 20*a*, the deposit and/or storage element 14*a* to the interface 16*a* of the airplane seat element 10*a* of the airplane seat 12*a* arranged in front of him. The drink vessels 26*a*, 28*a* and/or food items are thus arranged at the front airplane seat 12*a* in a secure and fixed fashion. Flight passengers who do not wish beverages or food items will receive no deposit and/or storage element 14*a*. The deposit and/or storage elements 14*a*, 56*a* may herein be simply loaded with several drink vessels 26*a*, 28*a* and/or a food item and then handed to the flight passenger by a staff member. This allows handing over several drink vessels 26*a*, 28*a* and/or food items together to a flight passenger in an advantageous and easy fashion. In contrast to a system without deposit and/or storage elements 14*a*, 56*a*, in which it is difficult to hand each drink vessel and/or food items item separately and/or drink vessels and/or food items together to the flight passenger, the proposed system with the deposit and/or storage elements 14*a*, 56*a* saves time and increases the flight passengers' comfort. When the deposit and/or storage elements 14*a*, 56*a* are collected afterwards, the deposit and/or storage elements 14*a*, 56*a* may be removed from the interface 16*a* of the airplane seat element 10*a* of the respective airplane seat 12*a* by the flight passengers themselves and may then be given to a staff member. The deposit and/or storage elements 14*a*, 56*a* with the drink vessels 26*a*, 28*a* and/or packaging material which may still be contained therein, can then be together stowed in a container or disposed of, or the deposit and/or storage elements 14*a*, 56*a* may be directly re-ranged into the receiving device of the transporting and serving device 62*a*. Principally other possibilities of storing the deposit and/or storage elements 14*a*, 56*a* in the transporting and serving device 62*a* are also conceivable. It is herein conceivable, for example, that the transporting and serving device 62*a* comprises a feed-in automatically conveying the deposit and/or storage elements 14*a*, 56*a* to a removal opening. The removal opening would in this case be arranged, for example, at an upper side of the transporting and serving device 62*a*, with the deposit and/or storage elements 14*a*, 56*a* being arranged in a receptacle underneath the removal opening. Herein a spring device, which pushes the deposit and/or storage elements 14*a*, 56*a* towards the removal opening, is arranged in the receptacle underneath the removal opening. As a result of this, the following deposit and/or storage element 14a, 56a is automatically pressed into the removal opening for removal as soon as the uppermost deposit and/or storage element 14a, 56a is taken from the removal opening.

In FIGS. 5 to 10 six further exemplary embodiments of the invention are shown. The following description and the drawings are substantially restricted to the differences between the exemplary embodiments, wherein as regards identically denominated structural element, in particular as regards structural elements with the same reference numerals, principally the drawings and/or the description of the other exemplary embodiments, in particular of FIGS. 1 to 4, may be referred to. For distinguishing the exemplary embodiments, the letter a is set after the reference numerals of the exemplary embodiment of FIGS. 1 to 4. In the exemplary embodiments of FIGS. 5 to 10 the letter a has been substituted by the letters b to g.

FIG. 5 shows a second exemplary embodiment of an airplane eat device according to the invention. The airplane seat device comprises an airplane seat 12b and an airplane seat element 10b. The airplane seat element 10b forms a portion of the airplane seat 12b. The airplane seat element 10b is herein embodied as a backrest. The airplane seat 12b is embodied substantially identical to the corresponding airplane seat of the first exemplary embodiment. The airplane seat 12b is herein implemented table-less, and comprises an interface 16b corresponding to the one of the first exemplary embodiment of FIGS. 1 to 4.

The airplane seat device comprises a deposit and/or storage element 14b. The deposit and/or storage element 14b is implemented separate from the airplane seat element 10b. The deposit and/or storage element 14b can be connected to the airplane seat element 10b if required. The deposit and/or storage element 14b has an upper side 32b. The upper side 32b of the deposit and/or storage element 14b is embodied as a table top. The deposit andlor storage element 14b has a basic shape that is substantially identical to the first exemplary embodiment. Differently from the first exemplary embodiment, the deposit and/or storage element 14b comprises only one receptacle 22b, in which a drink vessel 26b, 28b can be arranged. In a region next to the receptacle 22b a deposit surface 70b is formed by the deposit and/or storage element 14b. Food items, to give an example, may be deposited on the deposit surface 70b. Principally it would also be conceivable that the deposit and/or storage element 14b comprises only a receptacle 22b for the drink vessel 26b and no additional deposit surface 70b, which would result in the deposit and/or storage element 14b having only half the size as compared to the implementation shown. In a region of the deposit surface 70b the deposit and/or storage element 14b has a print region 72b. In the print region 72b, for example, an advertisement or a logo of the airline may be printed. Principally it is also conceivable that a notification which is specifically personalized for the passenger is printed in the print region 72b. The deposit and/or storage element 14b is made of a cellulose material. Herein the deposit and/or storage element 14b is made of cardboard. In a region of an interface 20b the deposit and/or storage element 14b is re-enforced by a plastic material. The deposit and/or storage element 14b is provided to be used only once. After use by the flight passenger, the deposit and/or storage element 14b is disposed of together with the drink vessels 26b and possible packaging material. This allows particularly advantageously cost-effective production of the deposit and/or storage element 14b.

FIG. 6 shows a third exemplary embodiment of an airplane seat device according to the invention. The airplane seat device comprises an airplane seat 12c and an airplane seat element 10c. The airplane seat element 10c forms a portion of the airplane seat 12c. The airplane seat element 10c is herein embodied as a backrest. The airplane seat 12c is embodied substantially identically to the corresponding airplane seat of the first exemplary embodiment. The airplane seat 12c is herein implemented table-less and comprises an interface 16c corresponding to the one of the first exemplary embodiment of FIGS. 1 to 4.

The airplane seat device comprises a deposit and/or storage element 14c. The deposit and/or storage element 14c is embodied separate from the airplane seat element 10c. The deposit and/or storage element 14c is embodied as a holding device. The deposit and/or storage element 14c embodied as a holding device is provided for holding a third element, e.g. in particular a PED, i.e. a tablet computer, a smartphone or the like. Herein the third element, which is arranged in the deposit and/or storage element 14c embodied as a holding device, can be operated by a person sitting on a respective airplane seat 12c. For holding the third element which is embodied as a FED, the deposit and/or storage element 14c embodied as a holding device is implemented as a substantially planar plate. On a front end, which in a mounted state faces away from the airplane seat element 10c, the deposit and/or storage element 14c embodied as a holding device comprises a hollow 74c. In the region of the hollow 74c the deposit and/or storage element 14c embodied as a holding device extends firstly downwards and then upwards. The hollow 74c is embodied V-shaped. The hollow 74c is provided for allowing an underside of the third element to be supported on a wall 76c of the hollow 74c. The deposit and/or storage element 14c embodied as a holding device further comprises a support element 78c. The support element 78c is pivotably arranged on the deposit and/or storage element 14c embodied as a holding device. The support element 78c is implemented as T-shaped flat plate. The support element 78c is herein arranged on the deposit and/or storage element 14c embodied as a holding device with a short side. The support element 78c is herein fixedly but pivotably connected by its short side to the deposit and/or storage element 14c embodied as a holding device. For stowage of the support element 78c the deposit and/or storage element 14c embodied as a holding device comprises a recess 80c having a contour of the support element 78c. The support element 78c is in a non-use operating state arranged in the recess 80c. The support element 78c is provided for supporting the third element, which is held in the deposit and/or storage element 14c embodied as a holding device, on its side which faces the airplane seat 12c. Herein the third element, in particular the PED, is arranged in the hollow 74c with a lower end, and is herein supported on the wall 76c of the hollow 74c, and abuts the raised support element 78c with its rear side that faces the airplane seat element 10c. In this way the third element can be held in the deposit and/or storage element 14c embodied as a holding device in an advantageously inclined fashion.

FIG. 7 shows a fourth exemplary embodiment of an airplane seat device according to the invention. The airplane seat device comprises an airplane seat 12d and an airplane seat element 10d. The airplane seat element 10d forms a portion of the airplane seat 12d. The airplane seat element 10d is herein embodied as a backrest. The airplane seat 12d is embodied substantially identical to the corresponding airplane seat of the above exemplary embodiments. On a rear side 60d of the airplane seat element 10d embodied as a backrest, a literature net 36*d* is arranged in a lower region. Principally it is also conceivable that a high literature pocket or other elements, e.g. a display screen or a holding device for advertising, are arranged on the rear side 60*d* of the airplane seat element 10*d* embodied as a backrest, The airplane seat 12*d* is herein embodied table-less. The airplane seat element 10*d* comprises an interface 16*d* which differs from the one of the previous exemplary embodiments. The interface 16*d* comprises a first form-fit element 82*d* and a second form-fit element 84*d*. The form-fit elements 82*d*, 84*d* are implemented as hooks extending away from a rear side 60*d* of the airplane seat element 10*d* embodied as a backrest. The form-fit elements 82*d*, 84*d* embodied as hooks herein have, on an end facing away from the airplane seat element 10*d*, an upwards bump, which faces away from amounting plane which the airplane seat 12*d* is mounted on. It is herein conceivable that the form-fit elements 82*d*, 84*d* can be sunk into the interface 16*d* of the airplane seat element 10*d* in a position of being stowed in the airplane seat element 10*d*. For this purpose the airplane seat element 10*d* could comprise receptacles in which the form-fit elements 82*d*, 84*d* are introduced spring-loaded and can be blocked in the stowage position and in a use position.

The airplane seat device comprises a deposit and/or storage element 14*d*. The deposit and/or storage element 14*d* is implemented separate from the airplane seat element 10*d*. The deposit and/or storage element 14*d* can be connected to the airplane seat element 10*d* if required. The deposit and/or storage element 14*d* is embodied as a serving element. The deposit andlor storage element 14*d* is made of a cellulose material. Herein the deposit and/or storage element 14*d* is made of paper or of cardboard. The deposit and/or storage element 14*d* is implemented as a box. The deposit and/or storage element 14*d* comprises a bottom (not shown in detail) having a rectangular basic shape. The bottom is delimited on its outer edges by outer walls 86*d*, 88*d*, 90*d*, 92*d*. The outer wall 86*d*, which faces the airplane seat element 10*d* in a state when mounted to the airplane element 10*d*, is herein higher than the remaining outer walls 88*d*, 90*d*, 92*d*. The deposit and/or storage element 14*d* comprises an intermediate wall 94*d*, which separates the deposit and/or storage element 14*d* embodied as a box into two partial regions 96*d*, 98*d* of equal size, which are separate from each other. In each of the partial regions 96*d*, 98*d* respectively one drink vessel 26*d*, 28*d* and/or one snack 50*d* can be arranged. The deposit and/or storage element 14*d* comprises an interface 20*d*, via which the deposit and/or storage element 14*d* can be connected to the airplane seat element 10*d*. The interface 20*d* comprises two form-fit elements 100*d*, 102*d*, which are embodied as pass-through holes. In the state when mounted to the airplane seat element 10*d*, the form-fit elements 100*d*, 102*d* embodied as pass-through holes are inserted into the outer wall 86*d*, which is implemented higher and faces the airplane seat element 10*d*. The form-fit elements 100*d*, 102*d* embodied as pass-through holes, are herein arranged at an upper end of the outer wall 86*d*. For connecting the deposit and/or storage element 14*d* to the airplane seat 12*d*, the form-fit elements 100*d*, 102*d*, which are embodied as pass-through holes, are guided over the form-fit elements 82*d*, 84*d* of the interface 16*d* of the airplane seat element 10*d*, which are embodied as hooks, as a result of which the form-fit elements 82*d*, 84*d* embodied as hooks engage into the form-fit elements 100*d*, 102*d* embodied as pass-through holes. Principally it would also be conceivable that the form-fit elements 82*d*, 84*d* of the interface 16*d* of the airplane seat element 10*d* are embodied as hollows into which the form-fit elements 100*d*, 102*d* of the interface 20*d* of the deposit and/or storage element 14*d*, which are embodied as bumps extending from the outer wall 86*d* towards the airplane seat element 10*d*, engage in a form-fit fashion. Herein the deposit and/or storage element 14*d* made of a cellulose material is folded up. In an unfolded state the deposit and/or storage element 14*d* is implemented flat and can be stored in an easy and space-saving manner. For use the deposit and/or storage element 14*d* can simply be unfolded, such that the outer walls 86*d*, 88*d*, 90*d*, 92*d* delimit the bottom. Said folding process can be carried out easily and quickly by a staff member during a serving procedure.

FIG. 8 shows a fifth exemplary embodiment of an airplane seat device according to the invention. The airplane seat device comprises an airplane seat 12*e* and an airplane seat element 10*e*. The airplane seat element 10*e* forms a portion of the airplane seat 12*e*. The airplane seat element 10*e* is herein embodied as a backrest. The airplane seat 12*e* is embodied substantially identical to the corresponding airplane seat of the fourth exemplary embodiment. The airplane seat 12*e* is herein embodied table-less. The airplane seat element 10*e* comprises an interface 16*e*, which corresponds to the one of the fourth exemplary embodiment of FIG. 7.

The airplane seat device comprises a deposit and/or storage element 14*e*. The deposit and/or storage element 14*e* is implemented separate from the airplane seat element 10*e*. The deposit and/or storage element 14*e* can be connected to the airplane seat element 10*e* if required. The deposit and/or storage element 14*e* is embodied as a serving element. The deposit and/or storage element 14*e* is made of a cellulose material. Herein the deposit and/or storage element 14*e* is made of paper or of cardboard. The deposit and/or storage element 14*e* comprises a rear wall 104*e*, which faces and at least partially abuts the airplane seat element 10*e* in a state when connected to the airplane seat element 10*e*. The deposit and/or storage element 14*e* comprises an interface 20*e*, which is inserted into the rear wall 104*e* and is embodied equivalently to the interface of the fourth exemplary embodiment. On a lower end of the rear wall 104*e* the deposit and/or storage element 14*e* has a 90-degree bend and transforms into a bottom plate 106*e*. The bottom plate 106*e* extends, in a state when connected to the airplane seat element 10*e*, from a rear end 108*e*, in which it is connected to the rear wall 104*e*, away from the airplane seat element 10*e* and the rear wall 104*e*, up to a front end 110*e* of the deposit and/or storage element 14*e*. On its front end 110*e*, the deposit and/or storage element 14*e* has an approximately 45-degree bend. From the 45-degree bend a holding plate 112*e* extends upwards toward the interface 20*e* of the deposit and/or storage element 14*e*. Two receptacles 22*e*, 24*e* are introduced into the holding plate 112*e*. The receptacles 22*e*, 24*e* are provided for allowing drink vessels 26*e*, 28*e*, such as in particular cups, to be arranged therein. The receptacles 22*e*, 24*e* are herein elliptically introduced into the obliquely arranged holding plate 112*e*. As can be seen in FIG. 8, snacks 50*e* or other elements can be placed on the bottom plate 106*e* behind the two drink vessels 26*e*, 28*e* which are arranged in the receptacles 22*e*, 24*e*.

FIG. 9 shows a sixth exemplary embodiment of an airplane seat device according to the invention. The airplane seat device comprises an airplane seat 12*f* and an airplane seat element 10*f*. The airplane seat element 10*f* forms a portion of the airplane seat 12*f*. The airplane seat element 10*f* is herein embodied as a backrest. The airplane seat 12*f* is embodied substantially identical to the corresponding airplane seat of the fourth exemplary embodiment. The airplane seat 12f is herein implemented table-less. The airplane seat element 10f comprises an interface 16f corresponding to the one of the fourth and fifth exemplary embodiments of FIGS. 7 and 8.

The airplane seat device comprises a deposit and/or storage element 14f. The deposit and/or storage element 14f is implemented separate from the airplane seat element 10f. The deposit and/or storage element 14f can be connected to the airplane seat element 10f if required. The deposit and/or storage element 14f is embodied as a serving element. The deposit and/or storage element 14f is made of a plastic material. The deposit and/or storage element 14f comprises a rear wall 104f, in which an interface 20f of the deposit and/or storage element 14f is arranged. The interface 20f is herein embodied identical to the interfaces of the fourth and fifth exemplary embodiments. On a lower end of the rear wall 104f, the deposit and/or storage element 14f comprises a tube-shaped region 114f. A first end 116f of the tube-shaped region 114f abuts to the rear wall 104f in a one-piece implementation. The tube-shaped region 114f forms approximately 360 degrees and a second end 118f of the tube-shaped region 114f then faces the first end 116f and hence the rear wall 104f. On the second end 118f of the tube-shaped region 114f, a connection region 120f follows, which is fixedly connected to the rear wall 104f. Herein the connection region 120f is adhesively bonded to the rear wall 104f. Principally other types of connection are of course also conceivable. At a lower surface of the tube-shaped region 114f, the deposit and/or storage element 14f comprises two receptacles 22f, 24f, which are arranged spaced apart from each other. The receptacles 22f, 24f are respectively provided for allowing a drink vessel 26f, 28f to be arranged therein. In a region above the receptacles 22f, 24f, a pass-through opening 122f is arranged in the tube-shaped region 114f and in parts of the connection region 120f, through which pass-through opening 122f the drink vessels 26f, 28f can be introduced from above into the tube-shaped region 114f and then into the receptacles 22f, 24f which are arranged therein.

FIG. 10 shows a seventh exemplary embodiment of an airplane seat device according to the invention. The airplane seat device comprises an airplane seat 12g and an airplane seat element 10g. The airplane seat element 10g forms a portion of an airplane seat 12g. The airplane seat element 10g is herein embodied as a backrest. The airplane seat 12g is implemented substantially identical to the corresponding airplane seat of the fourth exemplary embodiment. The airplane seat 12g is herein embodied table-less. The airplane seat element 10g comprises an interface 16g. The interface 16g is embodied differently from the preceding exemplary embodiments. The interface 16g comprises two form-fit elements 124g, 126g, which are arranged in parallel to each other and are implemented as slots.

The airplane seat device comprises a deposit and/or storage element 14g. The deposit and/or storage element 14g is implemented separate from the airplane seat element 10g. The deposit and/or storage element 14g can be connected to the airplane seat element 10g if required. The deposit and/or storage element 14g is embodied as a serving element. The deposit and/or storage element 14g is made of a cellulose material. The deposit and/or storage element 14g comprises a table top 128g and a support element 130g. The table top 128g and the support element 130g are connected to each other at a front end 132g. Herein the table top 128g and the support element 130g are embodied in a one-part implementation. The support element 130g extends from a front end 132g, in which it is connected to the table top 128g, approximately in the same direction as the table top 128g, in an angle of less than 10 degrees. The table top 128g and the support element 130g each comprise respectively one form-fit element 134g, 136g of an interface 20g of the deposit and/or storage element 14g. The form-fit elements 134g, 136g are respectively arranged on a second end 138g, 140g of the table top 128g and of the support element 130g, which faces away from the front end 132g. The form-fit elements 134g, 136g are formed by the second ends 138g, 140g. The form-fit elements 134g, 136g of the deposit and/or storage element 14g are introduced into the form-fit elements 124g, 126g of the interface 16g of the airplane seat element 10g, which are embodied as slots, and are connected thereto in a form-fit and/or force-fit fashion. It is herein conceivable that the second ends 138g, 140g of the table top 128g and of the support element 130g are respectively re-enforced by a coating for the implementation as form-fit elements 124g, 126g. Principally it is also conceivable that the deposit and/or storage element 14g comprises further tabs, which can be bent off, and can be folded out in a mounted state of the deposit and/or storage element 14g for stabilizing and for an improved force transfer, and which can, for example, couple the table top 128g and the support element 130g to each other in further points. In a not mounted state, the table top 128g and the support element 130g can be folded to each other for better stowage. This allows storing the deposit and/or storage element 14g in a particularly space-saving manner. For mounting to the airplane seat element 10g, the support element 130g is folded away from the table top 128g to such an extent that the form-fit element 134g of the table top 128g as well as the form-fit element 136g of the support element 130g can be introduced into the corresponding form-fit element 124g, 126g of the interface 16g of the airplane seat element 10g. Both the form-fit element 134g of the table top 128g and the form-fit element 136g of the support element 130g are slid and/or clamped into the corresponding form-fit element 124g, 126g of the interface 16g of the airplane seat element 10g. Forces acting via drink vessels 26g, 28g, snacks 50g or other elements deposited on the table top 128g are introduced into the airplane seat element 10g via the support element 130g.

REFERENCE NUMERALS 10 airplane seat element
12 airplane seat
14 deposit and/or storage element
16 interface
18 force-fit and/or form-fit element
20 interface
22 receptacle
24 receptacle
26 drink vessel
28 drink vessel
30 underside
32 upper side
34 compensation device
36 literature net
38 lateral edge
40 lateral edge
42 front edge
44 rear edge
46 outer wall
48 outer wall
50 snack
52 depression
54 bump 56 further deposit and/or storage element
58 force-fit and/or form-fit element
60 rear side
62 transporting and serving device
64 receiving device
66 lateral wall
68 receptacle
70 deposit area
72 print region
74 hollow
76 wall
78 support element
80 recess
82 form-fit element
84 form-fit element
86 outer wall
88 outer wall
90 outer wall
92 outer wall
94 intermediate wall
96 partial region
98 partial region
100 form-fit element
102 form-fit element
104 rear wall
106 bottom plate
108 rear end
110 front end
112 holding plate
114 tube-shaped region
116 first end
118 second end
120 connection region
122 pass-through opening
124 form-fit element
126 form-fit element
128 table top
130 supporting element
132 front end
134 form-fit element
136 form-fit element
138 second end
140 second end
142 fixing element
144 fixing element
146 front wall
148 undercut
150 upper wall
152 receptacle
154 receptacle

The invention claimed is:

1. An airplane seat device comprising:
at least one airplane seat element, embodied as a backrest, implementing at least a portion of an airplane seat that does not include a tray table; and
at least one of a deposit element and a storage element which is embodied separate from the airplane seat element, wherein:
the airplane seat element comprises at least one interface via which the at least one of the deposit element and storage element can be connected to the airplane seat element,
the at least one of the deposit element and the storage element is embodied as a serving element, which is of a rectangular, polygonal, circular or oval shaped substantially planar plate, and
an upper side and an under side of the at least one of the deposit element and the storage element are formed such that the upper side of the at least one of the deposit element and the storage element engages in a form fit fashion into the under side of a like deposit element or storage element whereby the at least one of the deposit element and the storage element is stackable with like deposit elements or storage elements.

2. The airplane seat device according to claim 1, wherein the interface comprises at least one of a force-fit element and a form-fit element, via which the at least one of the deposit element and the storage element can be connected to the airplane seat element.

3. The airplane seat device according to claim 2, wherein the at least one of the force-fit element and the form-fit element of the interface is embodied as a recess, which the at least one of the deposit element and the storage element is insertable into.

4. The airplane seat device at least according to claim 3, wherein
the at least one of the deposit element and the storage element further comprises at least one interface which can be coupled to the interface of the airplane seat element.

5. The airplane seat device according to claim 2, wherein the at least one of the deposit element and the storage element is provided to be mounted to the airplane seat element tool-lessly.

6. The airplane seat device according to claim 2, wherein the at least one of the deposit element and the storage element comprises at least one receptacle for a drink vessel.

7. The airplane seat device according to claim 2, wherein the at least one of the deposit element and the storage element is embodied as a holding device.

8. The airplane seat device according to claim 1, wherein the at least one of the deposit element and the storage element is provided to be mounted to the airplane seat element tool-lessly.

9. The airplane seat device according to claim 1, wherein the at least one of the deposit element and the storage element comprises at least one receptacle for a drink vessel.

10. The airplane seat device according to claim 1, wherein the at least one of the deposit element and the storage element is embodied as a holding device.

11. The airplane seat device according to claim 1, wherein the at least one of the deposit element and the storage element is at least substantially made of at least one of a plastic material and a cellulose material.

12. The airplane seat device according to claim 1, wherein the interface of the airplane seat element comprises at least one compensation device, which is provided for movement-technically decoupling the at least one of the deposit element and the storage element from the airplane seat element at least partially.

13. The airplane seat device according to claim 1, wherein the upper side of the at least one of the deposit element and the storage element is formed with a depression further formed with two receptacles, and
the under side of the at least one of the deposit element and the storage element is formed with a bump that corresponds to the depression.

14. The airplane seat device according to claim 13, wherein a height of the bump is smaller than a depth of the depression.

* * * * *